United States Patent
Beck et al.

(10) Patent No.: US 11,739,829 B2
(45) Date of Patent: Aug. 29, 2023

(54) MECHANICAL REDUCTION GEAR FOR AN AIRCRAFT TURBOMACHINE

(71) Applicant: SAFRAN TRANSMISSION SYSTEMS, Colombes (FR)

(72) Inventors: Guillaume Julien Beck, Moissy-Cramayel (FR); Patrice Jocelyn Francis Gedin, Moissy-Cramayel (FR); Simon Loic Clement Lefebvre, Moissy-Cramayel (FR); Balint Pap, Moissy-Cramayel (FR); Quentin Pierre Henri Pigott, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/454,118

(22) Filed: Nov. 9, 2021

(65) Prior Publication Data
US 2022/0145806 A1 May 12, 2022

(30) Foreign Application Priority Data
Nov. 12, 2020 (FR) ........................ 2011581

(51) Int. Cl.
*F16H 57/04* (2010.01)
*F02C 7/36* (2006.01)
*F16H 1/28* (2006.01)

(52) U.S. Cl.
CPC .......... *F16H 57/0479* (2013.01); *F02C 7/36* (2013.01); *F16H 1/28* (2013.01);
(Continued)

(58) Field of Classification Search
CPC ......... F16H 57/0479; F16H 2001/2881; F16H 2001/289; F02C 7/36; F05D 2260/40311
See application file for complete search history.

(56) References Cited

U.S. PATENT DOCUMENTS

| | | | | |
|---|---|---|---|---|
| 4,271,928 A | * | 6/1981 | Northern | F16C 33/103 184/6.12 |
| 10,358,941 B2 | * | 7/2019 | Madge | F01D 25/162 |
| 2020/0332721 A1 | | 10/2020 | Simon et al. | |

FOREIGN PATENT DOCUMENTS

| | | |
|---|---|---|
| DE | 102018009737 A1 | 6/2020 |
| EP | 3726031 A1 | 10/2020 |

(Continued)

OTHER PUBLICATIONS

Search Report for French Application No. 2011581 dated Jun. 18, 2021.

*Primary Examiner* — Erin D Bishop
(74) *Attorney, Agent, or Firm* — WOMBLE BOND DICKINSON (US) LLP

(57) ABSTRACT

A mechanical reduction gear for a turbomachine, in particular for an aircraft, the reduction gear including a sun gear, a ring gear, planet gears which are meshed with the sun gear and the ring gear, hydrodynamic bearings for guiding the planet gears in rotation, these bearings being carried by a planet carrier and including cylindrical bodies which are engaged in the planet gears and which are configured so as to be supplied with oil and so as to form guiding oil films between the bodies and the planet gears, wherein each of the planet gears is guided by two hydrodynamic bearings independent of each other and disposed on either side of the plane.

15 Claims, 7 Drawing Sheets

(52) U.S. Cl.
CPC ............... *F05D 2260/40311* (2013.01); *F16H 2001/289* (2013.01); *F16H 2001/2881* (2013.01)

(56) References Cited

FOREIGN PATENT DOCUMENTS

| | | | |
|---|---|---|---|
| FR | 3008462 | A1 | 1/2015 |
| FR | 2987416 | A1 | 9/2016 |
| FR | 3041054 | A1 | 3/2017 |
| WO | 2010092263 | A1 | 8/2010 |

\* cited by examiner

-- Prior Art --

-- Prior Art --

-- Prior Art --

-- Prior Art --

MECHANICAL REDUCTION GEAR FOR AN AIRCRAFT TURBOMACHINE

TECHNICAL FIELD OF THE INVENTION

The present invention relates to the field of mechanical reduction gears for turbomachines, in particular of an aircraft.

TECHNICAL BACKGROUND

The prior art comprises in particular the documents WO-A1-2010/092263, FR-A1-2 987 416, FR-A1-3 008 462, FR-A1-3 008 462 and FR-A1-3 041 054. The prior art also comprises the documents EP-A1-3 726 031 and DE-A1-10 2018 009737.

The role of a mechanical reduction gear is to change the speed and torque ratio between the input axle and the output axle of a mechanical system.

The newer generations of dual flow turbomachines, especially those with high bypass ratios, comprise a mechanical reduction gear to drive the fan of a shaft. Typically, the purpose of the reduction gear is to transform the so-called fast rotational speed of the shaft of a power turbine into a slower rotational speed for the shaft driving the fan.

Such a reduction gear comprises a central pinion, called the sun gear, a ring gear and pinions called planet gears, which are meshed between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution and are equally spaced on the same operating diameter around the axis of the planetary gear. These axes are parallel to the longitudinal axis X.

There are several reduction gear architectures. In the prior art of the dual flow turbomachine, the reduction gears are of the planetary or epicyclic type. In other similar applications, there are so-called differential or "compound" architectures.

In a planetary reduction gear, the planet carrier is fixed and the ring gear is the output shaft of the device which rotates in the opposite direction of the sun gear.

In an epicyclic reduction gear, the ring gear is fixed and the planet carrier is the output shaft of the device which rotates in the same direction as the sun gear.

on a compound reduction gear, no element is fixed in rotation. The ring gear rotates in the opposite direction to the sun gear and the planet carrier.

The reduction gears can be composed of one or more meshing stages. This meshing is achieved in different ways such as by contact, friction or magnetic fields.

In the present application, "stage" or "toothing" means a series of teeth meshing with a series of complementary teeth. A toothing may be internal or external.

A planet gear may comprise one or two meshing stages. A single-stage planet gear comprises a toothing which may be straight, helical or chevron-shaped and whose teeth are located on the same diameter. This toothing cooperates with both the sun gear and the ring gear.

A double-stage planet gear comprises two toothings or two series of teeth that are located on different diameters. A first toothing cooperates with the sun gear and a second toothing cooperates with the ring gear.

In addition, each planet gear is centred and guided in rotation around an axis by a bearing which is carried by the planet carrier. There are several bearing technologies available for this application and the present application relates more specifically to the use of hydrodynamic bearings for guiding planet gears in a mechanical reduction gear.

In the present application, a "hydrodynamic bearing" is defined as a bearing comprising a body that engages a planet gear and around which a pressurised oil film is located. In the prior art, a hydrodynamic bearing of planet gear comprises a cylindrical body comprising an external cylindrical surface which extends into an internal cylindrical surface of the planet gear. The pressurised oil film is interposed between these surfaces and ensures that there is no contact between them.

One of the disadvantages of this type of reduction gear is the relatively large axial dimension of the planet gears, which take up large loads generated by the transmission of the torque to the meshings, as well as by the centrifugal effects applied to the planet gears in the case of an epicyclic reduction gear. The bearings that support the planet gears and guide them in rotation are therefore loaded and there is little room to integrate them without considerably increasing the size of the reduction gear.

Rolling bearing element could be used as bearings. However, the bearings have a load capacity that does not allow them to be placed under the toothing of the planet gears, so they must be placed outside the planet gears to give them a sufficient diameter, which considerably increases the size of the reduction gear.

From the point of view of space requirements, it is therefore preferable to use plain bearings or hydrodynamic bearings, which have higher load capacities. This allows the bearings to be placed under the toothings of the planet gear, i.e. in a small diameter, and axially long space. A hydrodynamic bearing is usually supplied with oil from its middle and this oil is discharged from its axial ends. It is easy to design a long bearing that extends the full length of the planet gear. Such a bearing has a higher load capacity than the minimum required and requires a high oil flow rate since this flow rate depends, among other things, on the length of the bearing. This type of bearing also generates significant power losses. However, in order to have an efficient reduction gear, the required oil flow rate and the power losses must be as low as possible.

The invention thus proposes an improvement to the guidance of planet gears by means of hydrodynamic bearings, when these planet gears have a double meshing stage.

SUMMARY OF THE INVENTION

The invention concerns a mechanical reduction gear for a turbomachine, in particular of an aircraft, this reduction gear comprising:

a sun gear having an axis of rotation, a ring gear which extends around the sun gear, planet gears which are meshed with the sun gear and the ring gear, each planet gear comprising a first toothing of mean diameter, called the first diameter, D1, for meshing with the sun gear, and a second toothing of mean diameter D2, called the second diameter, different from D1, for meshing with the ring gear, the first and second toothing of each planet gear being symmetrical with respect to a plane perpendicular to said axis and passing substantially through the middle of the planet gear, each of the first and second toothings comprising two series of teeth, the two series of teeth of the first toothing being disposed on either side of said plane, and the two series of teeth of the second toothing being disposed on either side of said plane and of the first toothing, hydrodynamic bearings for guiding the planet gears in rotation, these hydrodynamic bearings being carried by a planet carrier and comprising cylindrical bodies which are engaged in the planet gears and which are configured to be supplied with oil and to form guiding oil films between the cylindrical bodies and the planet gears, characterised in that each of the planet gears is guided by two hydrodynamic bearings independent of each other and arranged on either side of said plane.

Contrary to the prior art which proposes to guide each planet gear by a single hydrodynamic bearing, the invention proposes to guide each planet gear by two hydrodynamic bearings. The bearings for guiding the same planet gear are at a distance from and independent of each other. It is therefore understood that these bearings are shorter than a single planet gear guide bearing, and also use less oil in operation due to their smaller axial dimensions. The required oil flow rates are then considerably reduced, as the bearing lengths can be calculated to have exactly the required load capacity to accommodate the meshing forces and centrifugal effects. Furthermore, by being spaced apart, the two bearings are much less susceptible to misalignment than a single bearing running the length of the planet gear.

The reduction gear according to the invention may comprise one or more of the following features, taken in isolation from each other, or in combination with each other:

said two hydrodynamic bearings are located respectively in line with the series of teeth of the second toothing;

each of the planet gears is crossed by a single cylindrical body defining said two hydrodynamic bearings;

each of the hydrodynamic bearings comprises two first guiding external cylindrical surfaces which have a diameter D3, called third diameter, and a first oil discharge external cylindrical surface which has a diameter D4, called fourth diameter, smaller than D3 and which extends between the two guiding surfaces, these first guiding surfaces being configured to form guiding oil films;

the cylindrical body comprises radial internal ducts which extend from an internal bore of the cylindrical body to the two first guiding cylindrical surfaces;

each of the planet gears comprises two second guiding internal cylindrical surfaces, and a second oil discharge internal cylindrical surface which extends between the two second guiding surfaces, these second guiding surfaces extending around the first guiding surfaces to form said guiding oil films;

said second discharge surface extends around and with a predetermined clearance from said first discharge surface;

the second guiding surfaces and the second discharge surface have substantially a same diameter D5, referred to as the fifth diameter;

the second guiding surfaces extend axially and respectively over the entire axial extent of the series of teeth of the second toothing, and the second discharge surface extends axially over the entire axial extent of the series of teeth of the first toothing;

each of the planet gears comprises a cylindrical sleeve and an annular web extending substantially radially outwards from the middle of that sleeve, the teeth of the second toothing being located at the axial ends of the sleeve, and the teeth of the first toothing being located at the external periphery of the web;

the sleeve comprises through openings for oil discharge located on either side of said plane and between the series of teeth of the second toothing;

the openings are located in two planes perpendicular to the axis of rotation of each of the planet gears and passing respectively between the first toothing and the series of teeth of the second toothing;

the openings are located at the axial ends of the first discharge surface, or even of the second discharge surface.

The invention further relates to a turbomachine, in particular an aircraft turbomachine, comprising a mechanical reduction gear as described above.

BRIEF DESCRIPTION OF THE FIGURES

Further features and advantages will be apparent from the following description of a non-limiting embodiment of the invention with reference to the attached drawings in which.

DETAILED DESCRIPTION OF THE INVENTION

Figure 1:
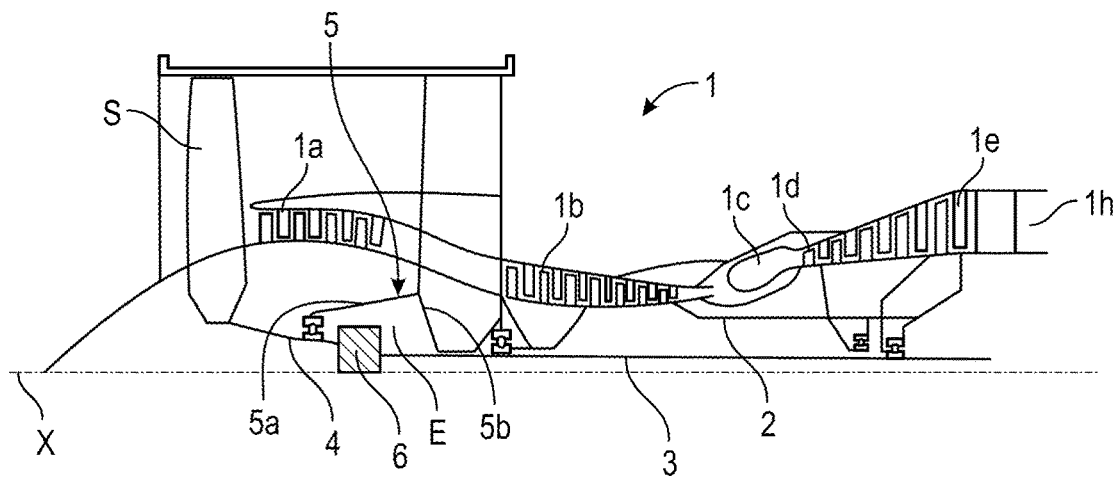
FIG. 1 is a schematic axial sectional view of a turbomachine using the invention.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body.

The fan S is driven by a fan shaft 4 which is driven by the LP shaft 3 by means of a reduction gear 6. This reduction gear 6 is generally of the planetary or epicyclic type.

The following description relates to a reduction gear of the epicyclic type, the planet carrier and the sun gear of which are mobile in rotation, the ring gear of the reduction gear being fixed in the reference frame of the motor.

The reduction gear 6 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 6. This enclosure E is closed upstream by seals at the level of a bearing allowing the passage of the fan shaft 4, and downstream by seals at the level of the passage of the LP shaft 3.

Figure 2:
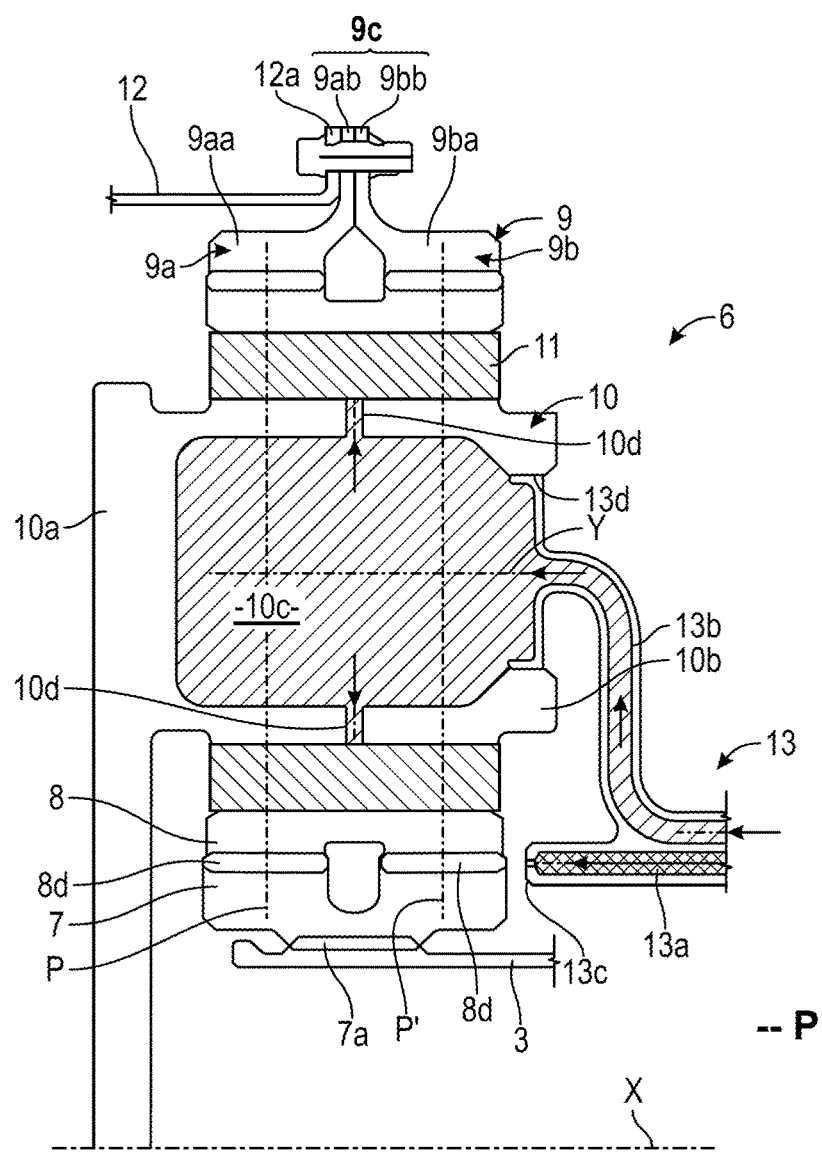
FIG. 2 is a partial view of a mechanical reduction gear in axial section.

FIG. 2 shows an epicyclic reduction gear 6. On the input side, the reduction gear 6 is connected to the LP shaft 3, for example via internal splines 7a. Thus, the LP shaft 3 drives a planetary gear called the sun gear 7. Classically, the sun gear 7, whose axis of rotation is coincident with that of the turbomachine X, drives a series of pinions called planet gears 8, which are equally spaced on the same diameter around the axis of rotation X. This diameter is equal to twice the operating centre distance between the sun gear 7 and the planet gears 8. The number of planet gears 8 is generally defined between three and seven for this type of application.

The set of planet gears 8 are held together by a frame called a planet carrier 10. Each planet gear 8 rotates around its own axis Y, and meshes with the ring gear 9.

At the output we have:

In this epicyclic configuration, the set of planet gears 8 rotate the planet carrier 10 around the axis X of the turbomachine. The ring gear is attached to the engine casing or stator 5 via a ring gear carrier 12 and the planet carrier 10 is attached to the fan shaft 4.

In another planetary configuration, the set of planet gear 8 is held by a planet gear carrier 10 which is attached to the motor housing or stator 5. Each planet gear 8 drives the ring gear which is attached to the fan shaft 4 via a ring gear carrier 12.

In another differential configuration, the set of planet gear 8 is held by a planet carrier 10 which is connected to a first fan shaft 5. Each planet gear 8 drives the ring gear which is connected to a second counter-rotating fan shaft 4 via a ring gear carrier 12.

Each planet gear 8 is freely mounted in rotation by means of a bearing 11, for example a bearing or hydrodynamic bearing. Each bearing 11 is mounted on one of the shafts 10b of the planet carrier 10 and all the shafts are positioned relative to each other by means of one or more structural frames 10a of the planet carrier 10. There are a number of axes 10b and bearings 11 equal to the number of planet gears. For reasons of operation, assembly, manufacture, inspection, repair or replacement, the axes 10b and the frame 10a may be separated into several parts.

For the same reasons mentioned above, the toothing of a planet gear can be separated into several helices or teeth each with a median plane P, P'. In our example, we detail the operation of a reduction gear in which each planet gear comprises two series of chevron teeth cooperating with a ring gear separated into two half ring gears:

An upstream half-ring gear 9a consisting of a rim 9aa and a mounting half-flange 9ab. On the rim 9aa is the front propeller meshed with a propeller of the toothing 8d of each planet gear 8. The propeller of the toothing 8d also meshes with that of the sun gear 7.

A downstream half-ring gear 9b consisting of a rim 9ba and a mounting half-flange 9bb. On the rim 9ba is the rear propeller meshed with a propeller of the toothing 8d of each planet gear 8. The propeller of the toothing 8d also meshes with that of the sun gear 7.

Although the propeller widths vary between the sun gear 7, the planet gears 8 and the ring gear 9 because of the overlapping toothing, they are all centred on a median plane P for the upstream teeth and on another median plane P' for the downstream teeth.

FIG. 2 thus illustrates the case of a single-stage reduction gear, i.e. the same toothing 8d of each planet gear 8 cooperates with both the sun gear 7 and the ring gear 9. Even if the toothing 8d comprises two series of teeth, these teeth have the same average diameter and form a single toothing called a chevron.

The mounting half-flange 9ab of the upstream ring gear 9a and the mounting half-flange 9bb of the downstream ring gear 9b form the attachment flange 9c of the ring gear. The ring gear 9 is attached to a ring gear carrier by joining the attachment flange 9c of the ring gear and the attachment flange 12a of the ring gear carrier by means of a bolted connection, for example.

The arrows in FIG. 2 describe the oil flow in the reduction gear 6. The oil enters the reduction gear 6 from the stator part 5 into a distributor 13 by different means, which will not be specified in this view because they are specific to one or more types of architecture. The distributor 13 comprises injectors 13a and arms 13b. The function of the injectors 13a is to lubricate the toothings and the function of the arms 13b is to lubricate the bearings. Oil is fed to the injector 13a and exits through the end 13c to lubricate the gears. The oil is also fed to the arm 13b and circulates through the supply inlet 13d of the bearing. The oil then circulates through the shaft into a buffer zone(s) 10c and then out through the orifices 10d to lubricate the planetary bearings.

Figure 3:
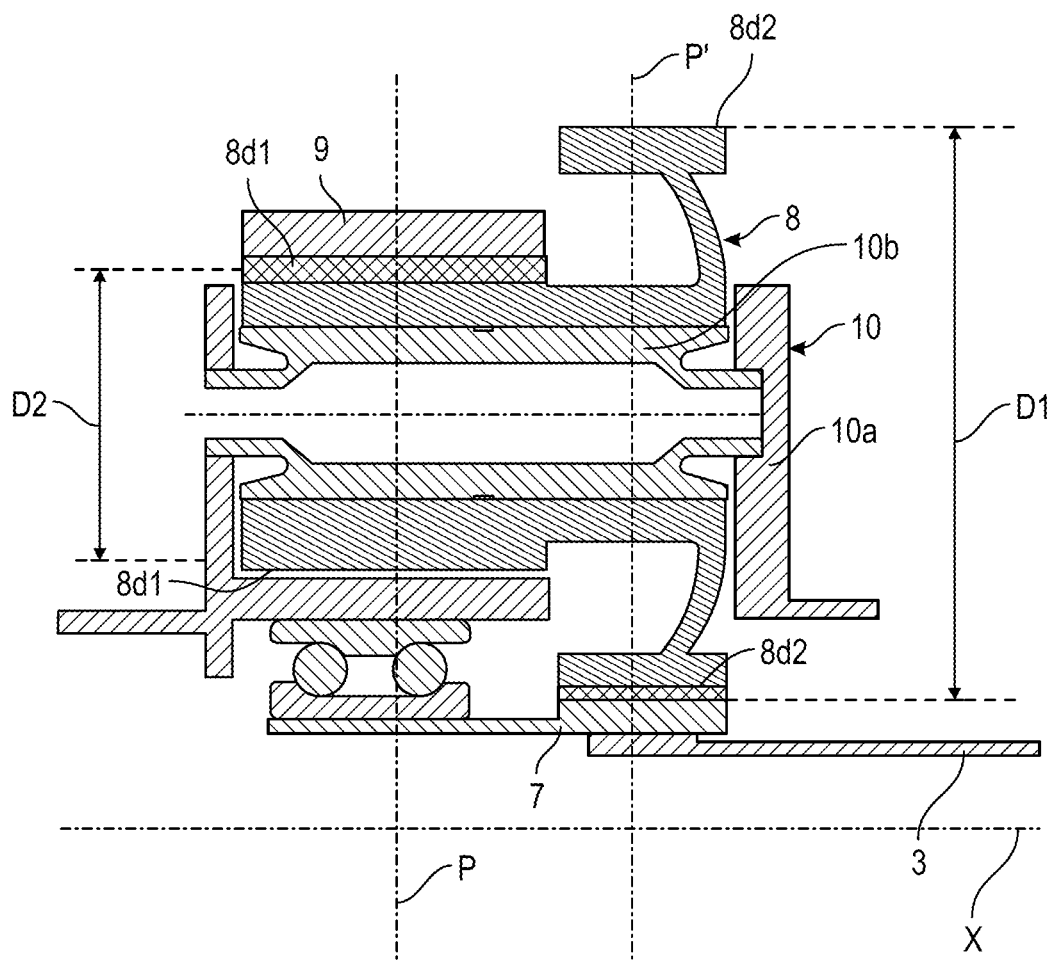
FIG. 3 is another partial axial cross-sectional view of a mechanical reduction gear, and illustrates the prior art of the present invention.

FIG. 3 shows another example of reduction gear architecture, known as a double meshing stage, in which each planet gear 8 comprises two separate toothings 8d1, 8d2 configured to cooperate respectively with the ring gear 9 and the sun gear 7.

In this FIG. 3, the elements already described above are designated by the same references.

The toothing 8d1 for meshing with the ring gear 9 have an average diameter noted D2 and are located in a median plane P. The toothing 8d2 meshing with the sun gear 7 has an average diameter D1 and is located in another median plane P'. The median planes P, P' are parallel to each other and perpendicular to the axis X. The diameter D2 is smaller than the diameter D1. Finally, each toothing 8d1, 8d2 comprises here a single propeller.

As mentioned above, this "double stage" architecture generates significant moments at the level of the planet gears 8, in particular because this double stage has asymmetric toothing.

Figure 4:
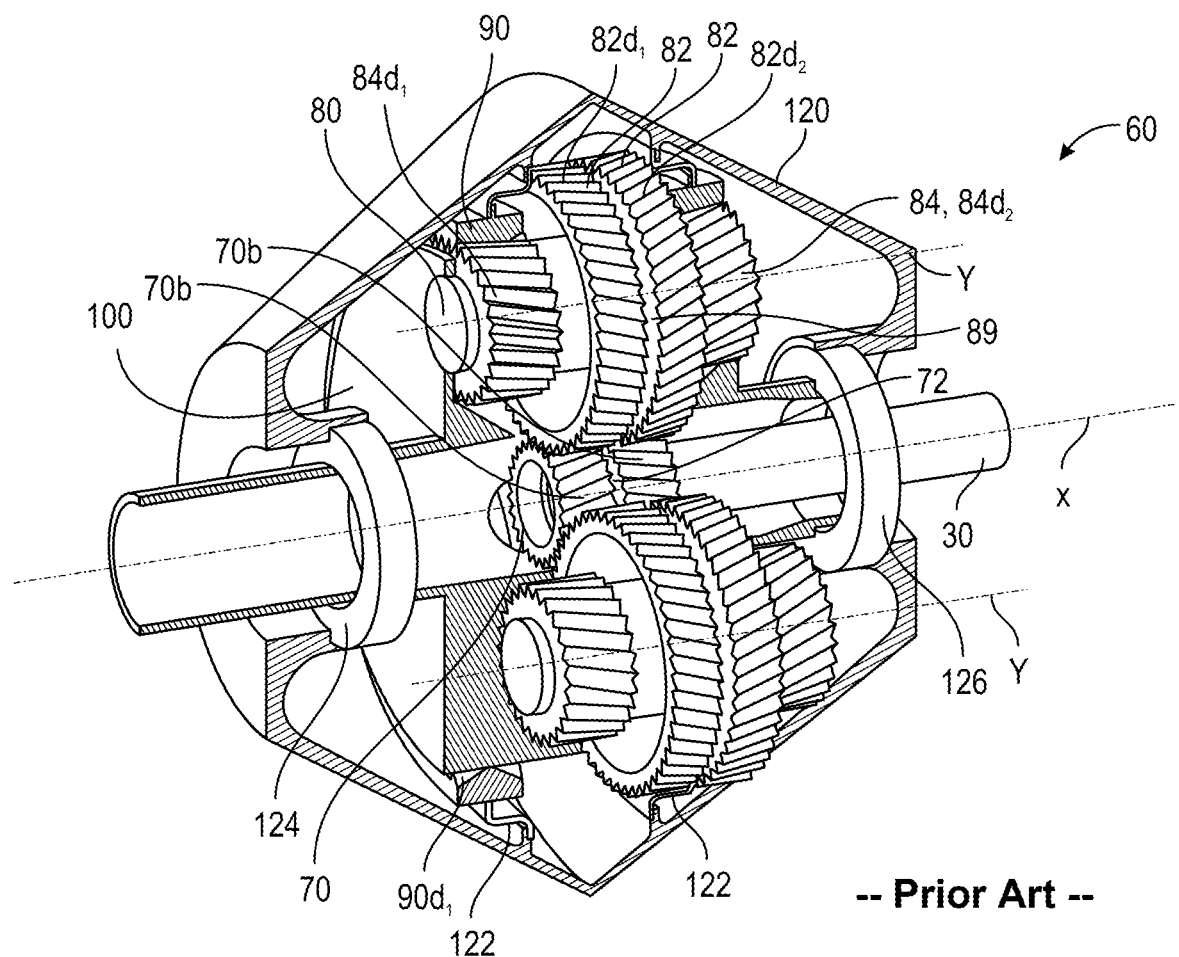
FIG. 4 is a schematic axial cross-sectional and perspective view of a symmetrical double-mesh reduction gear, and also illustrates the prior art of the present invention.
Figure 5:
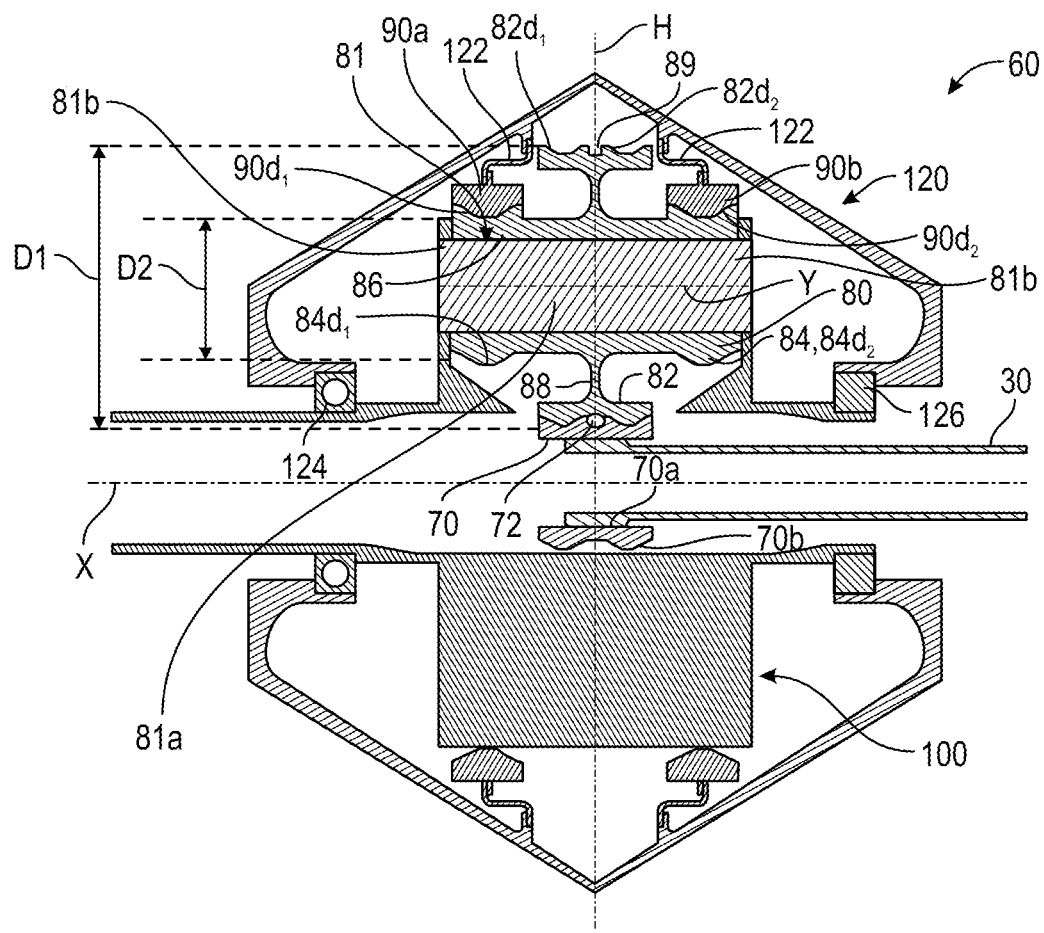
FIG. 5 is a further schematic axial cross-sectional view of the reduction gear of FIG. 4.

FIGS. 4 and 5 show a reduction gear 60 with symmetrical double toothing, which makes it possible to solve the above-mentioned problem.

This reduction gear 60 comprises:
a sun gear 70 with an axis of rotation X,
a ring gear 90 which extends around the sun gear and is configured to be rotationally immobile about the axis X, and
planet gears 80 which are meshed with the sun gear 70 and the ring gear 90 and which are held by a planet gear carrier 100 which is configured to be rotatable about the axis X.

The plane H is defined as a median plane perpendicular to the axis X and passing substantially through the middle of the reduction gear 60 (FIG. 5).

The sun gear 70 comprises internal splines 70a for coupling with the LP shaft 30 as well as an external toothing 70b for meshing with the planet gears 80. The toothing 70b have two series of adjacent chevron teeth, separated from each other by an annular groove 72 oriented radially outwards. The toothing 70b is symmetrical with respect to the plane H, its teeth being located on either side of the plane H which passes through the groove 72.

The ring gear 90 is formed by two independent rings 90a, 90b and comprises a toothing which is separated into two series of chevron teeth 90d1, 90d2 carried respectively by the two rings.

The rings 90a, 90b are arranged symmetrically with respect to the plane H which thus extends between them. The rings are connected and fixed to a ring gear carrier 120 by means of annular connecting plates 122. The plates 122 are independent of each other, each plate having a general S-shape in axial half-section providing it with a certain radial flexibility by elastic deformation during operation.

Each ring 90a, 90b extends around the axis X and is fixed to the corresponding plate 122 by its external periphery. Its internal periphery comprises one of the teeth 90d1, 90d2.

The ring gear carrier 120 has a generally annular shape around the axis X and is more particularly biconical. It thus comprises a first upstream or left-hand section in the drawing, with an upstream end of smaller diameter, and a downstream end of larger diameter which is connected to the upstream end of larger diameter of the other, downstream or right-hand section in the drawing. The larger diameter ends of the sections are thus connected to each other, and their smaller diameter ends form the axial ends of the ring gear carrier.

The upstream end of the ring gear carrier 120 extends around the planet carrier 100 or a shaft connected to this planet carrier, and is centred and guided in rotation on the planet carrier or the shaft by means of at least one bearing 124. Similarly, the downstream end of the ring gear carrier 120 extends around the planet carrier 100 or a shaft connected to that planet carrier, and is centred and guided in rotation on the planet carrier or the shaft via at least one further bearing 126.

As is the case with the ring gear 90, the ring gear carrier 120 is symmetrical with respect to the plane H which intersects the ring gear carrier in the middle and thus passes through the ends of the larger diameter of the aforementioned sections.

Each planet gear 80 comprises a first toothing 82 of average diameter D1 for meshing with the sun gear 70, and a second toothing 84 of average diameter D2, different from D1 and in particular smaller than D1, for meshing with the ring gear 90. The average diameters are measured from the axis Y of each planet gear and each represents the average between the maximum and minimum diameter of a toothing of this planet gear.

Each planet gear 80 comprises a cylindrical sleeve 86 and an annular web 88 extending substantially radially outwards from the middle of the sleeve 86. The toothing 84 are separated into two series of chevron teeth 84d1, 84d2 which are located respectively on the axial ends of the sleeve 86. The toothing 82 comprises two series of chevron teeth 82d1, 82d2 which are located at the external periphery of the web 88 and which are separated from each other by an annular groove 89 opening radially outwards with respect to the axis Y.

The toothing 82 are crossed in the middle by the plane H which passes through the groove 89, the teeth 82d1, 82d2 therefore being arranged on either side of the plane H. The teeth 84d1, 84d2 are also arranged symmetrically in relation to the plane H.

The toothing 82 and the external periphery of the web 88 have an axial dimension which is less than the axial distance between the rings 90a, 90b, as well as between the plates 122, so that each planet gear 80 can rotate freely in the ring gear carrier 120 and between the rings 90a, 90b and the plates 122.

Each of the planet gears 80 is guided in rotation by a hydrodynamic bearing 81 which comprises a cylindrical body 81a which passes through the planet gear 80, and in particular its sleeve 86, and which is configured to form a film of guiding oil within the planet gear.

The body 81a of a bearing 26 extends along the axis Y and comprises at its longitudinal ends extensions 81b housed in holes forming seats of the planet carrier 100.

The body 81a is generally tubular and includes an internal oil circulation bore which generally communicates with ducts for feeding oil to an external cylindrical surface of the body for the formation of the oil film between that surface and an internal cylindrical surface of the planet gear 80.

In the illustrated example which illustrates the prior art, the hydrodynamic bearing and the oil film extend along the entire length or axial dimension of the planet gear 80.

Figure 6:
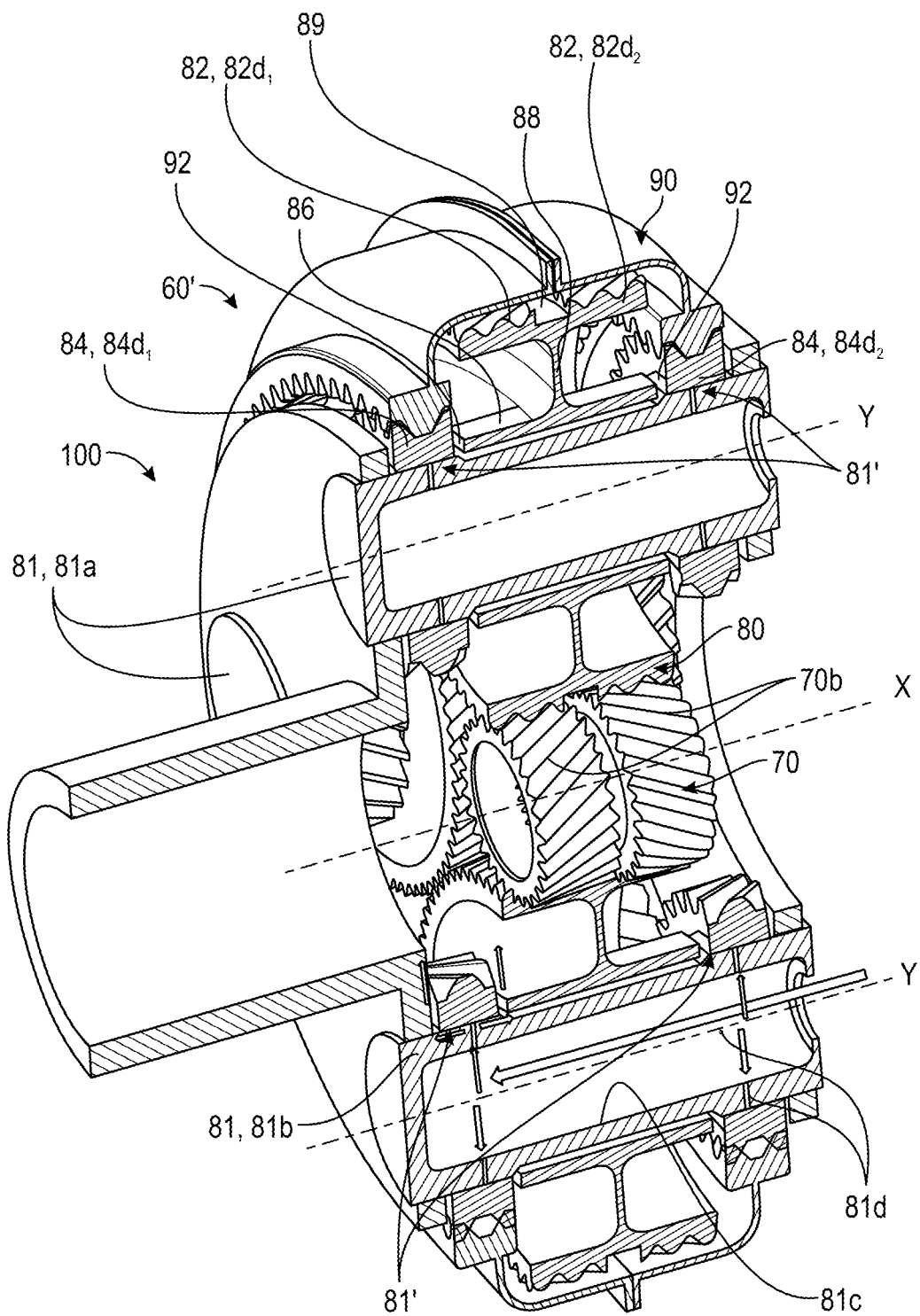
FIG. 6 is a schematic axial cross-sectional and perspective view of a reduction gear according to one embodiment of the invention.
Figure 7:
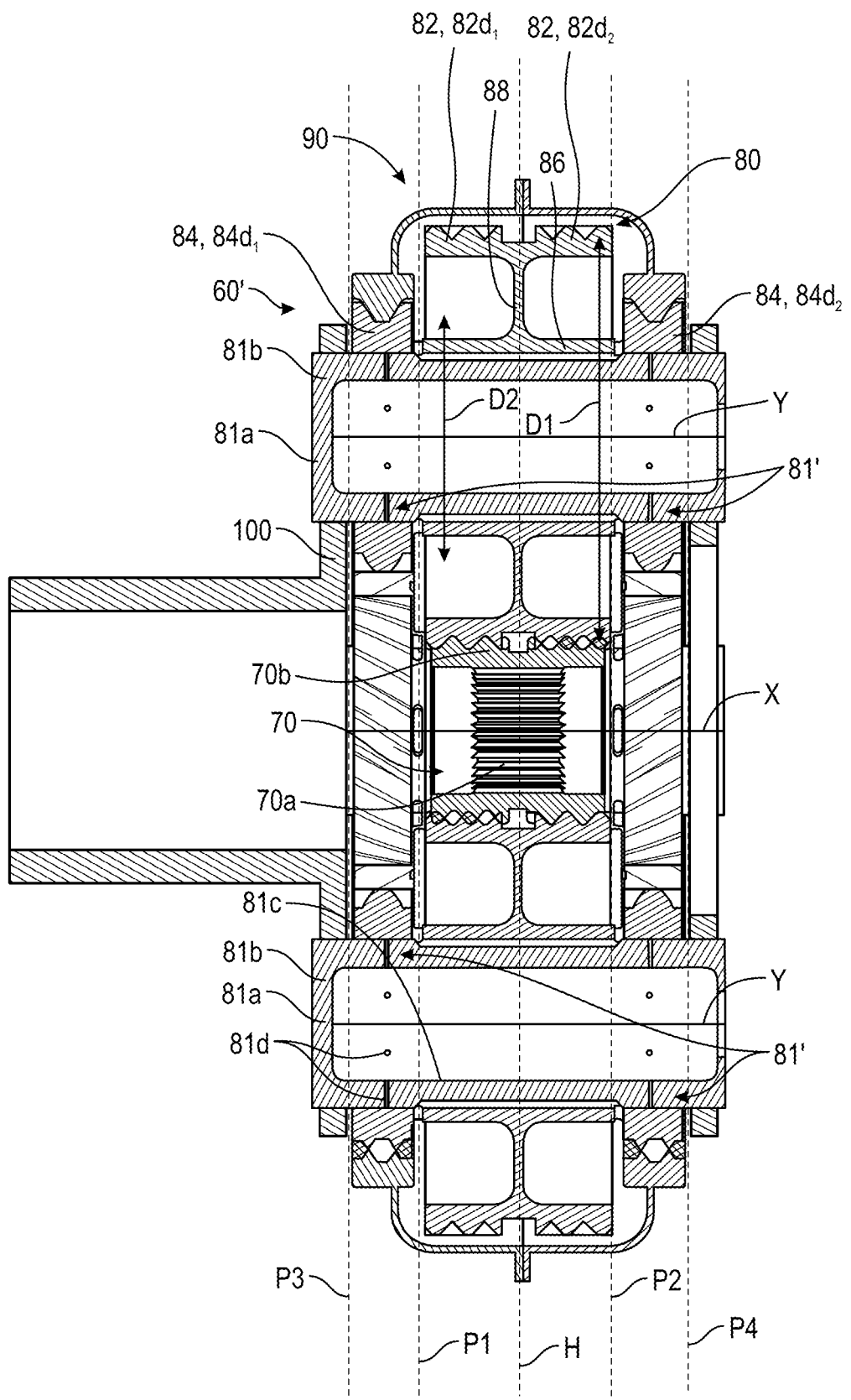
FIG. 7 is a further schematic axial cross-sectional view of the reduction gear of FIG. 6.
Figure 8:
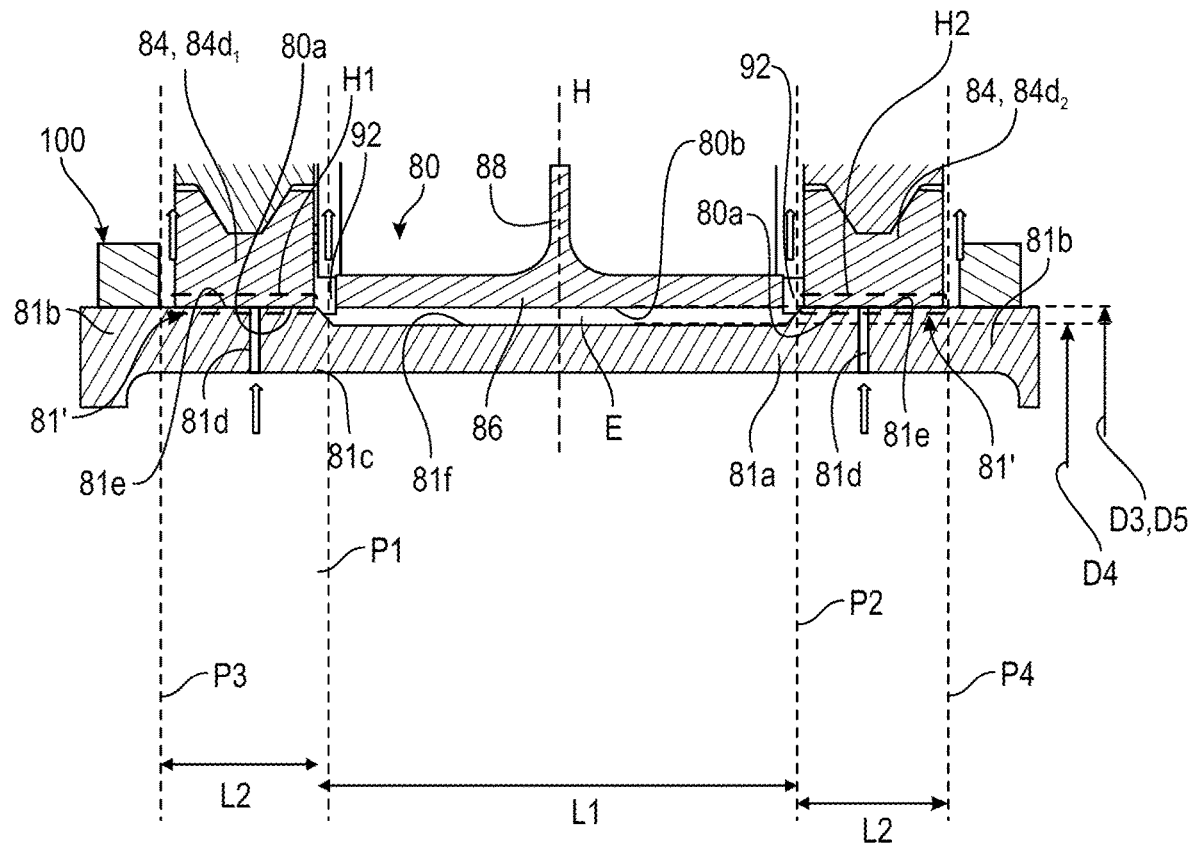
FIG. 8 is a larger scale view of a portion of the reduction gear of FIG. 6.

The present invention provides an improvement to this technology, an embodiment of which is shown in FIGS. 6 to 8.

The reduction gear 60' of FIGS. 6 to 8 includes all of the features described in the foregoing in relation to FIGS. 3, 4 and 5 insofar as they do not conflict with or contradict the following.

The references used in FIGS. 6 to 8 and already used in FIGS. 3, 4 and 5 therefore designate identical or similar elements.

The planet gear 80 is of the double-gear type and comprises a tubular sleeve 86 connected by a web 88 to a first external toothing 82, the sleeve 86 being itself equipped with a second toothing 84.

The first toothing 82 has an average diameter D1 and meshes with the sun gear 70, and the second toothing 84 has an average diameter D2, different from D1 and in particular smaller than D1, and meshes with the ring gear 90. The average diameters are measured from the axis Y of each planet gear 80 and represent the average between the maximum and minimum diameter of a toothing of this planet gear.

The toothing 84 is separated into two series of chevron teeth 84d1, 84d2, here, which are located respectively on the axial ends of the sleeve 86. The toothing 82 also comprises two series of chevron teeth 82d1, 82d2 here, which are located at the external periphery of the web 88 and which are separated from each other by an annular groove 89 opening radially outwards with respect to the axis Y.

The toothing 82 is crossed in the middle by the plane H which passes through the groove 89, the teeth 82d1, 82d2 therefore being arranged on either side of the plane H. The teeth 84d1, 84d2 are also arranged symmetrically with respect to the plane H (cf. FIG. 7).

Each of the planet gears 80 is guided in rotation by two hydrodynamic bearings 81' which are formed by a cylindrical body 81a which passes through the planet gear 80, and in particular its sleeve 86, and which is configured to form two guiding oil films H1, H2 inside the planet gear 80.

The following description relates to one planet gear 80 and its hydrodynamic guide bearings 81' but it is understood that it applies to all planet gears 80 and hydrodynamic bearings 81' of the reduction gear 60'.

The body 81a extends along the axis Y and comprises at its longitudinal ends extensions 81b housed in orifices forming seats of the planet carrier 100.

The body 81a is generally tubular and comprises an internal oil circulation bore 81c which communicates with ducts 81*d* for feeding oil to external cylindrical surfaces 81*e* of the body for the formation of the two oil films H1, H2 between these surfaces 81*e* and internal cylindrical surfaces 80*a* of the planet gear 80.

The surfaces 81*e* are axially spaced from each other and separated from each other by an external cylindrical surface 81*f*. As is best seen in FIG. 8, the surface 81*f* has a diameter D4 which is smaller than the diameter D3 of the surfaces 81*e*.

The surface 81*f* has an axial extent or dimension L1 which is equal to the axial extent or dimension of the first toothing 82 of the planet gear 80. This surface 81*f* is therefore bounded by two planes P1, P2 perpendicular to the axis Y and therefore parallel to each other and to the plane H, which pass respectively through the axial ends of the first toothing 82.

Each of the surfaces 81*e* has an axial extent or dimension L2 which is equal to the axial extent or dimension of a series of teeth 84*d*1, 84*d*2 of the second toothing 84 of the planet gear 80. Each surface 81*e* is bounded by one of the planes P1, P2 and by another plane P3, P4 perpendicular to the axis Y and passing through a free axial end of the planet gear 80.

It is thus understood that the surface 81*f* extends inside and along the first toothing 82, and that surfaces 81*e* extend respectively along and inside the series of teeth 84*d*1, 84*d*2 of the second toothing 84. Several ducts 81*d* may open into each surface 81*e*.

The surfaces 80*a* of each planet gear 80 are separated from each other by an internal cylindrical surface 80*b*.

As is best seen in FIG. 8, surfaces 80*a* and 80*b* have substantially the same diameter D5.

The surface 80*b* has an axial extent or dimension L1 and thus the same extent as the surface 81*f*.

Each of the surfaces 80*a* has an axial extent or dimension L2 and thus the same extent as a surface 81*e*.

It is therefore understood that the surface 81*f* extends within and along the surface 80*b*, and that surfaces 80*a* extend along and within surfaces 81*e* respectively.

It is also understood that the surfaces 80*a*, 81*e* of each pair of surfaces 80*a*-81*e* are in close radial spaced relation to each other so as to define a pressurised oil film therebetween. In contrast, the surfaces 80*b*, 81*e* are at a significant radial distance from each other so as to avoid the formation of a pressurised oil film in the annular space E between them. The two pressurised oil films H1, H2 are thus at a distance from and independent of each other, in particular because they are supplied by different ducts 81*d*.

FIGS. 6 to 8 show that each planet gear 80 comprises oil passage openings 92 at the sleeve 86, and more particularly in the aforementioned planes P1 and P2. A first annular row of openings 92 opens radially inwards at the axial ends of the surfaces 80*b*, 81*f*, and a second annular row of openings 92 opens radially inwardly at the opposite axial ends of these surfaces 80*b*, 81*f*.

The arrows in FIGS. 6 to 8 show the circulation of oil into the body 81 of a planet gear 80. The oil is injected into the bore 81*c* of the body 81 and passes through the ducts 81*d* to form oil films H1, H2 between the surfaces 80*b*, 81*f*. Some of this oil escapes from the plane H side and is then mainly discharged radially outwards through the openings 92. The remainder of the oil is discharged on the opposite side, radially outwards at planes P3 and P4.

The invention claimed is:

1. A mechanical reduction gear for a turbomachine, in particular for an aircraft, said reduction gear comprising:
    a sun gear having an axis of rotation,
    a ring gear which extends around the sun gear,
    planet gears which are meshed with the sun gear and the ring gear, each planet gear comprising a first toothing of mean diameter D1 for meshing with the sun gear, and a second toothing of mean diameter D2 different from D1, for meshing with the ring gear, the first and second toothing of each planet gear being symmetrical with respect to a plane perpendicular to said axis and passing substantially through the middle of the planet gear, each of the first and second toothings comprising two series of teeth, the two series of teeth of the first toothing being disposed on either side of said plane, and the two series of teeth of the second toothing being disposed on either side of said plane and the first toothing,
    hydrodynamic bearings for guiding the planet gears in rotation, these hydrodynamic bearings being carried by a planet carrier and comprising cylindrical bodies which are engaged in the planet gears and which are configured so as to be supplied with oil and so as to form guiding oil films between the cylindrical bodies and the planet gears,
    wherein each of the planet gears is guided by two hydrodynamic bearings independent of each other and arranged on either side of said plane, said two hydrodynamic bearings being separated one from the other by a distance and each of said two hydrodynamic bearings having a width which is less than said distance.

2. The mechanical reduction gear according to claim 1, wherein said two hydrodynamic bearings are located respectively in line with the two series of teeth of the second toothing.

3. The mechanical reduction gear according to claim 1, wherein each of said cylindrical bodies defines each of said two hydrodynamic bearings, respectively.

4. The mechanical reduction gear according to claim 3, wherein each of the hydrodynamic bearings comprises two first guiding external cylindrical surfaces which have a diameter D3, and a first oil discharge external cylindrical surface which has a diameter D4 less than D3 and which extends between the two first guiding surfaces, these first guiding surfaces being configured to form guiding oil films.

5. The mechanical reduction gear according to claim 4, wherein the cylindrical body comprises radial internal ducts which extend from an internal bore of the cylindrical body to the two first guiding cylindrical surfaces.

6. The mechanical reduction gear according to claim 4, wherein each of the planet gears comprises two second guiding internal cylindrical surfaces, and a second oil discharge internal cylindrical surface which extends between the two second guiding surfaces, these second guiding surfaces extending around the first guiding surfaces to form said guide oil films, and said second discharge surface extending around and with a predetermined clearance from said first discharge surface.

7. The mechanical reduction gear according to claim 6, wherein the second guiding surfaces and the second discharge surface have substantially a same diameter D5.

8. The mechanical reduction gear according to claim 6, wherein the second guiding surfaces extend axially and respectively over the entire axial extent of the two series of teeth of the second toothing, and the second discharge surface extends axially over the entire axial extent of the two series of teeth of the first toothing.

9. The mechanical reduction gear according to claim 6, wherein each of the planet gears comprises a cylindrical sleeve and an annular web extending substantially radially outwards from the middle of the sleeve, the teeth of the second toothing being located at the axial ends of the sleeve and the teeth of the first toothing being located at the external periphery of the web, the sleeve comprising through openings for oil discharge located on either side of said plane and between the two series of teeth of the second toothing, and wherein the openings are located at the axial ends of the first discharge surface and of the second discharge surface.

10. The mechanical reduction gear according to claim 4, wherein each of the planet gears comprises a cylindrical sleeve and an annular web extending substantially radially outwards from the middle of the sleeve, the teeth of the second toothing being located at the axial ends of the sleeve and the teeth of the first toothing being located at the external periphery of the web, the sleeve comprising through openings for oil discharge located on either side of said plane and between the two series of teeth of the second toothing, and wherein the openings are located at the axial ends of the first discharge surface.

11. The mechanical reduction gear according to claim 1, wherein each of the planet gears comprises a cylindrical sleeve and an annular web extending substantially radially outwards from the middle of the sleeve, the teeth of the second toothing being located at the axial ends of the sleeve and the teeth of the first toothing being located at the external periphery of the web, the sleeve comprising through openings for oil discharge located on either side of said plane and between the two series of teeth of the second toothing.

12. The mechanical reduction gear according to claim 11, wherein the openings are located in two planes perpendicular to the axis of rotation of each of the planet gears and passing respectively between the first toothing and the two series of teeth of the second toothing.

13. A turbomachine, in particular of an aircraft, comprising a mechanical reduction gear according to claim 1.

14. A mechanical reduction gear for a turbomachine, in particular for an aircraft, said reduction gear comprising:
a sun gear having an axis of rotation,
a ring gear which extends around the sun gear,
planet gears which are meshed with the sun gear and the ring gear, each planet gear comprising a first toothing of mean diameter $D1$ for meshing with the sun gear, and a second toothing of mean diameter $D2$ different from $D1$, for meshing with the ring gear, the first and second toothing of each planet gear being symmetrical with respect to a plane perpendicular to said axis and passing substantially through the middle of the planet gear, each of the first and second toothings comprising two series of teeth, the two series of teeth of the first toothing being disposed on either side of said plane, and the two series of teeth of the second toothing being disposed on either side of said plane and the first toothing,
hydrodynamic bearings for guiding the planet gears in rotation, these hydrodynamic bearings being carried by a planet carrier and comprising cylindrical bodies which are engaged in the planet gears and which are configured so as to be supplied with oil and so as to form guiding oil films between the cylindrical bodies and the planet gears,
wherein each of the planet gears is guided by two hydrodynamic bearings independent of each other and arranged on either side of said plane,
wherein each of said cylindrical bodies defines each of said two hydrodynamic bearings, respectively,
wherein each of the hydrodynamic bearings comprises two first guiding external cylindrical surfaces which have a diameter $D3$, and a first oil discharge external cylindrical surface which has a diameter $D4$ less than $D3$ and which extends between the two first guiding surfaces, these first guiding surfaces being configured to form guiding oil films,
wherein each of the planet gears comprises two second guiding internal cylindrical surfaces, and a second oil discharge internal cylindrical surface which extends between the two second guiding surfaces, these second guiding surfaces extending around the first guiding surfaces to form said guide oil films, and said second discharge surface extending around and with a predetermined clearance from said first discharge surface, and
wherein the second guiding surfaces extend axially and respectively over the entire axial extent of the two series of teeth of the second toothing, and the second discharge surface extends axially over the entire axial extent of the two series of teeth of the first toothing.

15. A mechanical reduction gear for a turbomachine, in particular for an aircraft, said reduction gear comprising:
a sun gear having an axis of rotation,
a ring gear which extends around the sun gear,
planet gears which are meshed with the sun gear and the ring gear, each planet gear comprising a first toothing of mean diameter $D1$ for meshing with the sun gear, and a second toothing of mean diameter $D2$ different from $D1$, for meshing with the ring gear, the first and second toothing of each planet gear being symmetrical with respect to a plane perpendicular to said axis and passing substantially through the middle of the planet gear, each of the first and second toothings comprising two series of teeth, the two series of teeth of the first toothing being disposed on either side of said plane, and the two series of teeth of the second toothing being disposed on either side of said plane and the first toothing,
hydrodynamic bearings for guiding the planet gears in rotation, these hydrodynamic bearings being carried by a planet carrier and comprising cylindrical bodies which are engaged in the planet gears and which are configured so as to be supplied with oil and so as to form guiding oil films between the cylindrical bodies and the planet gears,
wherein each of the planet gears is guided by two hydrodynamic bearings independent of each other and arranged on either side of said plane,
wherein each of the planet gears comprises a cylindrical sleeve and an annular web extending substantially radially outwards from the middle of the sleeve, the teeth of the second toothing being located at the axial ends of the sleeve and the teeth of the first toothing being located at the external periphery of the web, the sleeve comprising through openings for oil discharge located on either side of said plane and between the two series of teeth of the second toothing, and
wherein the openings are located in two planes perpendicular to the axis of rotation of each of the planet gears and passing respectively between the first toothing and the two series of teeth of the second toothing.

* * * * *